US 6,612,754 B2

United States Patent
Dahmani et al.

(10) Patent No.: US 6,612,754 B2
(45) Date of Patent: Sep. 2, 2003

(54) METHOD AND APPARATUS FOR SPLICING OPTICAL FIBERS

(75) Inventors: Brahim Dahmani, Montrouge (FR); Bertrand Paris, Thomery (FR); Romain Ramel, Fontainebleau (FR)

(73) Assignee: Corning Incorporated, Corning, NY (US)

( * ) Notice: Subject to any disclaimer, the term of this patent is extended or adjusted under 35 U.S.C. 154(b) by 134 days.

(21) Appl. No.: 09/802,783

(22) Filed: Mar. 8, 2001

(65) Prior Publication Data

US 2002/0015568 A1 Feb. 7, 2002

(51) Int. Cl.[7] .............................................. G02B 6/255
(52) U.S. Cl. ............................ 385/96; 385/95; 385/98; 385/134; 385/140; 65/501
(58) Field of Search ........................ 385/96–98, 88–91, 385/8, 9, 7, 95; 219/121.63, 121.64, 121.61; 65/36, 501

(56) References Cited

U.S. PATENT DOCUMENTS

| | | | | |
|---|---|---|---|---|
| 4,727,237 A | * | 2/1988 | Schantz ................. 219/121.63 |
| 4,739,287 A | | 4/1988 | Staupendahl et al. ...... 332/7.51 |
| 4,788,514 A | | 11/1988 | Fox ............................ 332/7.51 |
| 4,927,266 A | * | 5/1990 | Sugiura et al. .......... 356/243.1 |
| 5,166,509 A | * | 11/1992 | Curran ....................... 250/205 |
| 5,182,789 A | | 1/1993 | Nash-Stevenson et al. . 385/137 |
| 5,237,630 A | | 8/1993 | Hogg et al. .................... 385/12 |
| 5,299,274 A | * | 3/1994 | Wysocki et al. ............... 385/96 |
| 5,434,876 A | * | 7/1995 | Atkins et al. ............. 372/29.02 |
| 5,890,789 A | * | 4/1999 | Inagaki et al. ............... 359/204 |
| 6,041,069 A | | 3/2000 | Kashyap et al. ................ 372/6 |
| 6,414,262 B1 | * | 7/2002 | Rao ...................... 219/121.63 |
| 6,453,090 B1 | * | 9/2002 | Conde et al. ................ 385/115 |

FOREIGN PATENT DOCUMENTS

| | | |
|---|---|---|
| EP | 0 423 994 A1 | 10/1990 |
| JP | 05341152 | 12/1993 |

* cited by examiner

Primary Examiner—Robert H. Kim
Assistant Examiner—Michael H. Caley
(74) Attorney, Agent, or Firm—Price, Heneveld, Cooper, DeWitt & Litton; James Suggs

(57) ABSTRACT

A fiber splicing apparatus of the present invention includes a support (120a, 120b) for supporting the two optical fibers (112a, 112b) such that the ends (114a, 114b) thereof are aligned and in physical contact, and a laser (130) emitting a laser beam (142) onto the ends of the optical fibers to heat and thereby fuse together the ends (114a, 114b) of the fibers (112a, 112b). According to another embodiment, an apparatus is provided for heating a region (115) of one or more optical fibers(112a, 112b). This apparatus includes a laser (130) emitting a laser beam (132) and an optical modulator (134) positioned to receive and selectively modulate the intensity of the laser beam (132) to project a modulated laser beam (138) along a first optical path that terminates at the end (114a, 114b) of the optical fiber(s) (112a, 112b)to be heated. This apparatus further includes a control loop (133) to monitor the intensity of the modulated laser beam (138) and control the optical modulator (134) to thereby regulate the intensity of the modulated laser beam (138) in response to the monitored intensity level.

24 Claims, 3 Drawing Sheets

METHOD AND APPARATUS FOR SPLICING OPTICAL FIBERS

CROSS-REFERENCE TO RELATED APPLICATION

This application is base upon European Application Serial Number 00400815,7 filed on Mar. 23, 2000, from which the benefit of priority is hereby claimed, and the full content which is incorporated herein by reference as though fully set forth.

BACKGROUND OF THE INVENTION

1. Field of the Invention

The present invention generally relates to an apparatus for localized heating of optical fibers, and more particularly to an apparatus and method for splicing optical fibers. The present invention also relates to an apparatus for controlling the intensity of a laser beam.

2. Technical Background

Manufacturers and assemblers of optical networks, systems, and components often must splice two optical fibers together. This is typically accomplished by aligning and fusing the ends of the fibers.

FIG. 1 shows an electric splicer commonly used to splice the ends 14a and 14b of two fibers 12a and 12b together. Support members 20a and 20b support fibers 12a and 12b such that the fibers are aligned and the two ends abut one another. Fibers 12a and 12b extend from support members 20a and 20b in a cantilevered fashion with the ends of the fibers positioned equidistant from the support members by a distance a. A pair of electrodes 16a and 16b are provided on opposite sides of the splicing area 15 with their tips 18a and 18b, respectively, aligned along an axis that extends through the center of the splicing region 15. Then, by creating an electric arc between electrode tips 18a and 18b, the electric arc heats the ends 14a and 14b of the fibers above the melting point of the fibers to fuse the ends of the fibers together.

In the arrangement shown in FIG. 1, the cantilever distance a must be at least 3 mm to prevent the electric arc produced by the electrodes 16a and 16b from straying and reaching one of support members 20a or 20b. A cantilever distance a of 3 mm causes problems since this distance is about 24 times the diameter of the typical fiber (125 $\mu$m). This relatively large cantilever distance allows ends 14a and 14b to sag, which makes it very difficult to properly align the two ends 14a and 14b. Also contributing to alignment problems is the intrinsic curl that most fibers exhibit. This intrinsic curl is typically about 4 meters in radius. Also, when the fiber ends are pushed together, the fibers are more likely to flex with the larger cantilever distance and thereby cause misalignment. On average, such transverse misalignment of the fiber ends results in a 1 dB loss in the signals propagating through the spliced area.

Another difficulty in utilizing an electric splicer is in the control and maintenance of the electric arc in a small space with a predetermined and constant intensity. The localization and intensity of the electric arc at the splicing area is affected by numerous parameters including air pressure, hygrometry dependence of the electric arc, erosion of the electrode point, and dust and fiber particles on the electrodes.

Because of the above-noted problems experienced when utilizing an electric splicer, there exists a need for a fiber splicing apparatus that allows accurate and consistent splicing.

While $CO_2$ lasers have been utilized previously to heat portions of fibers to produce diffraction gratings and the like, the manner by which such $CO_2$ lasers were controlled is not sufficient to control a $CO_2$ laser to splice together the ends of two fibers. Specifically, when splicing optical fibers, the intensity of the laser beam is preferably maintained at a constant level to provide the appropriate energy density in splicing area 115. In the past, the intensity of $CO_2$ lasers has been controlled by monitoring the intensity level of the beam and by varying the duty cycle of the electrical power signal used to power the $CO_2$ laser. More specifically, a portion of the laser beam is split and provided to a thermopile detector that produces a voltage level corresponding to the intensity of the impinging laser beam. The voltage level generated by the detector is compared against a reference and used to regulate the duty cycle using pulse width modulation to thereby vary the voltage applied to an internal RF amplifier stage that controls the RF drive applied to the laser electrodes. Although $CO_2$ lasers are generally quite stable after an initial heating period, the intensity control system described above tends to destabilize the laser output by repeatedly undercompensating and then overcompensating the laser.

A $CO_2$ laser controlled using the above control system exhibits a random behavior in the range of ±2 percent of the total laser power. Knowing that the energy quantity is given by: $\Delta Q = P\Delta t = mC_P\Delta T$, where P is the energy on the fiber, $\Delta t$ is the pulse duration, m is the fiber weight, $C_p$ is the heat capacity which is 1200 J/kg/°C. and $\Delta T$ is the temperature difference. Thus, $$\Delta T = \frac{P\Delta t}{mC_p}.$$

Therefore, a ±2 percent variation in power P induces a ±2 percent variation in temperature at the splicing area. The temperature during the splice is about 1800° C. which is the melting temperature of the fiber. Thus, a ±2 percent variation in temperature leads to ±36° C. of temperature variation. Such a variation causes unacceptable inconsistencies during the fiber-splicing process.

SUMMARY OF THE INVENTION

Accordingly, it is an aspect of the present invention to solve the above problems by providing a splicing apparatus that allows the reduction of the cantilever distance of the fibers. It is another aspect of the present invention to provide a splicing apparatus having a stable splicing temperature thereby providing consistent spliced fiber characteristics. Another aspect of the invention is to provide a splicing apparatus that does not suffer from the problems associated with cleaning of electrodes.

To achieve these and other aspects and advantages, the splicing apparatus of the present invention comprises a support for supporting the two optical fibers such that the ends thereof are aligned and in physical contact. The splicing apparatus further includes a laser for projecting a laser beam onto the ends of the optical fibers to heat and thereby fuse together the ends of the fibers.

According to another embodiment, an apparatus is provided for heating a region of one or more optical fibers. The apparatus comprises a laser for producing a laser beam, and an optical modulator positioned to receive and selectively modulate the intensity of the laser beam to project a modulated laser beam along a first optical path that is directed to the ends of the optical fiber(s) to be heated. The apparatus further includes a control loop to monitor the intensity of the modulated laser beam and control the optical modulator to thereby regulate the intensity of the modulated laser in response to the monitored intensity level.

Additional features and advantages of the invention will be set forth in the detailed description which follows and will be apparent to those skilled in the art from the description or recognized by practicing the invention as described in the following description together with reference to the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
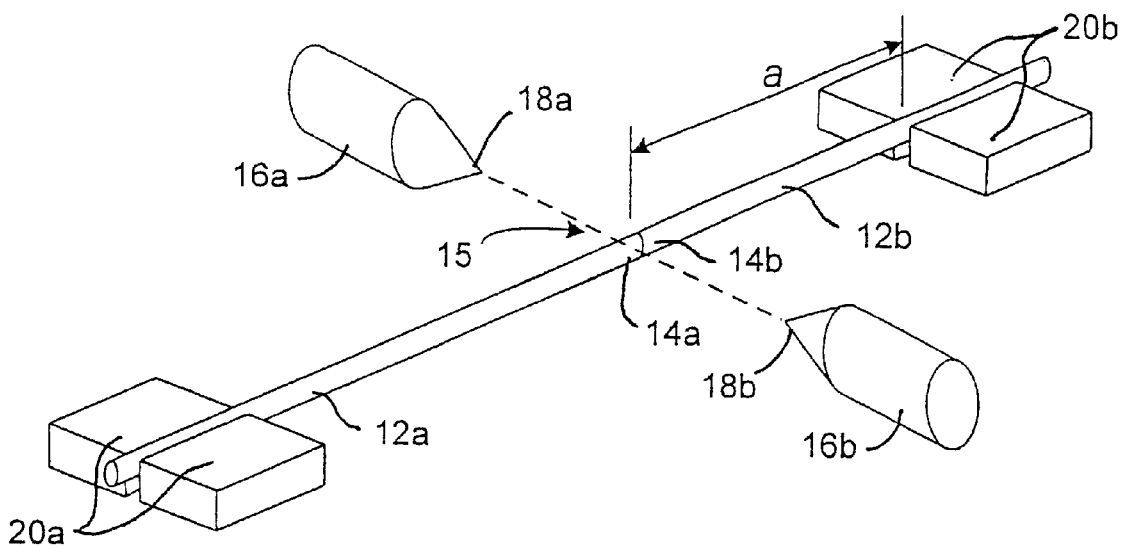
FIG. 1 is a schematic diagram illustrating a prior art electric splicing apparatus.
Figure 2:
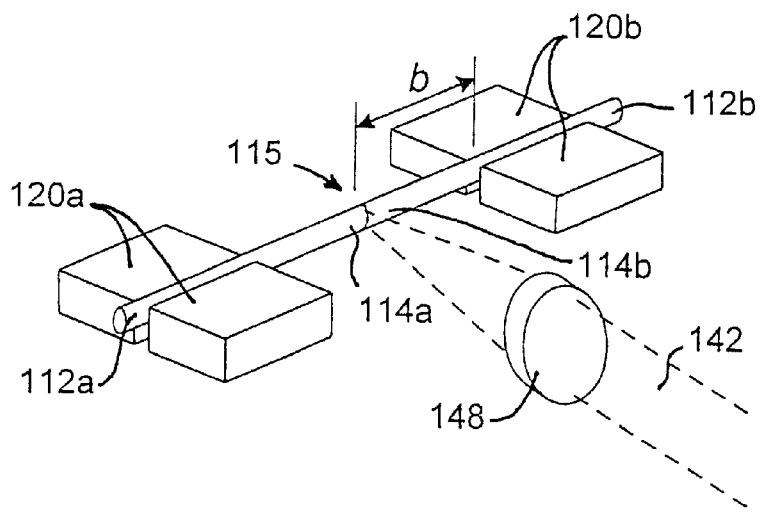
FIG. 2 is a schematic diagram illustrating a portion of the splicing apparatus constructed in accordance with the present invention.
Figure 3:
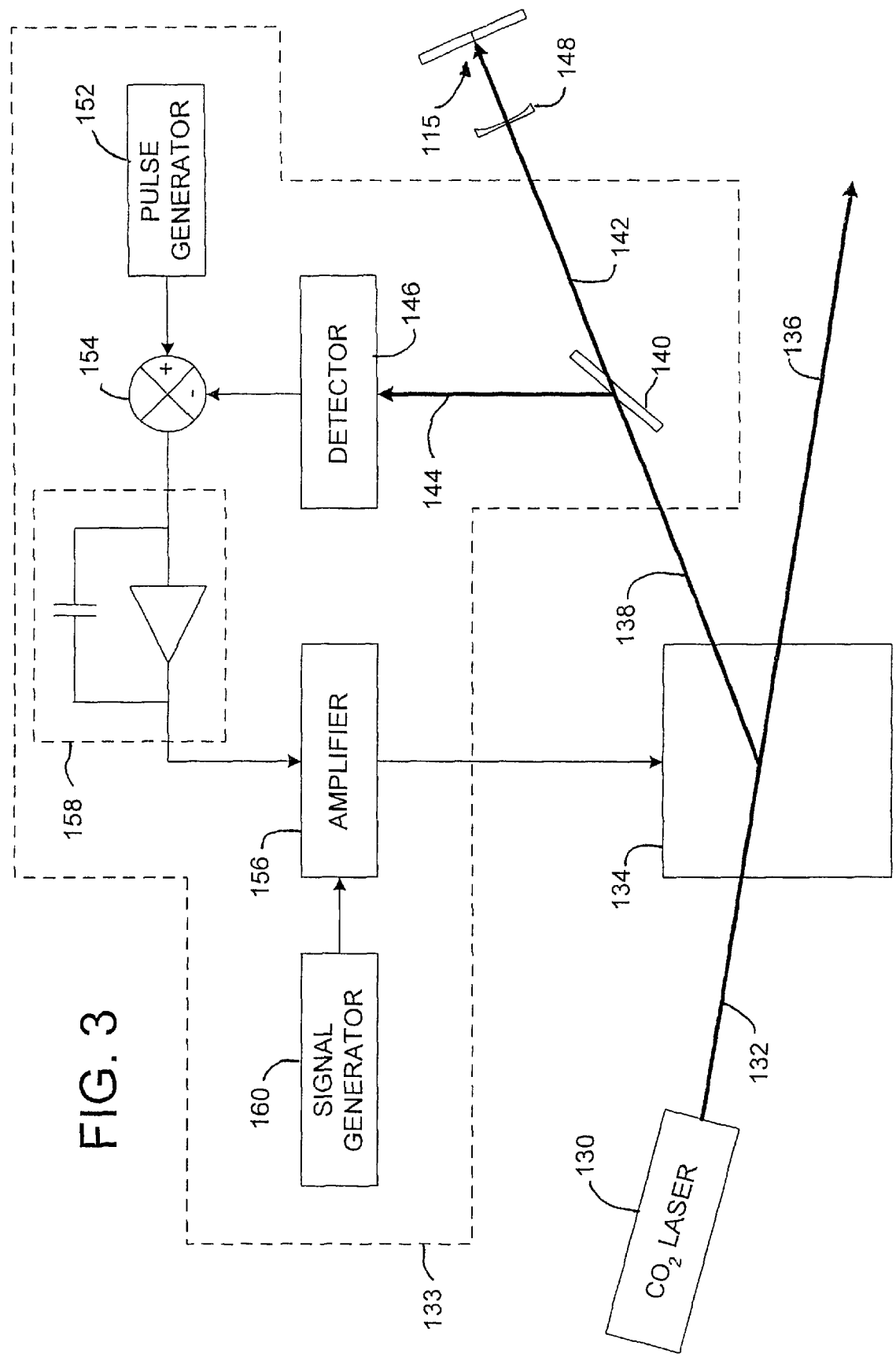
FIG. 3 is an optical/electrical diagram in block form of the splicing apparatus constructed in accordance with the present invention.

FIGS. 2 and 3 show a splicing apparatus constructed in accordance with the present invention. The splicing apparatus includes a support including support members 120a and 120b for supporting two optical fibers 112a and 112b such that the ends thereof, 114a and 114b respectively, are aligned and in physical contact. The region in which fiber ends 114a and 114b abut one another is referred to as splicing area 115. As shown in FIG. 2, fibers 112a and 112b are cantilevered from support members 120a and 120b. The cantilever distance b is much shorter than the cantilever distance a of the conventional electric splicer shown in FIG. 1. Thus, the distance between support members 120a and 120b of the inventive splicing apparatus is less than about 6 mm and is preferably about 1 mm. By thus reducing the cantilever distance b to about 0.5 mm, one may more readily align fiber ends 114a and 114b. Because of the reduced cantilever, fibers 112a and 112b are less likely to bend significantly when ends 114a and 114b are pushed together, and the intrinsic curl of fibers 112a and 112b is less likely to result in misalignment of the fiber ends.

To enable support members 120a and 120b to be spaced more closely together, the inventive splicing apparatus utilizes a laser beam 142 to heat and fuse fiber ends 114a and 114b instead of a plasma field such as produced by electrodes 16a and 16b (FIG. 1). The laser beam 142 may be focussed using a focussing lens 148 to a small spot at splicing area 115 with a high degree of consistency and precision. This focussed spot generally exhibits a Guassian energy distribution. Thus, many fibers may be spliced utilizing the inventive splicing apparatus that exhibit little variation in their characteristics as a result of the splice. Fibers spliced utilizing the splicing apparatus of this invention, on average, have exhibited minimal losses of only about 0.001 dB. This represents a very significant improvement over the conventionally spliced fibers that typically exhibit losses of about 1 dB.

As illustrated in FIG. 3, laser beam 142 is preferably produced by a $CO_2$ laser 130. Exemplary of laser 130 is model reference No.48-2-28(W) manufactured by SYN-RAD and distributed by BFI-OPTILAS, CE1834, 91018 Evry Cedex, France.

To avoid the previously described laser control problems, the inventive splicing apparatus utilizes a control loop 133 that acts upon the laser beam 132 output from $CO_2$ laser 130 instead of acting on $CO_2$ laser 130 directly. As shown in FIG. 3, the splicing apparatus includes an optical modulator 134 that selectively modulates the intensity of laser beam 132. The extent to which optical modulator 134 varies the intensity of laser beam 132 is controlled by control loop 133. Control loop 133 is described further below.

Optical modulator 134 is responsive to an electrical signal supplied from control loop 133 to modulate the intensity of laser beam 132. In the exemplary embodiment shown in FIG. 3, optical modulator 134 diffracts laser beam 132 into a zero order of diffraction beam 136 and a first order of diffraction beam 138. The first order of diffraction beam 138 is directed towards a focussing lens 148 and splicing area 115. The zero order diffracted beam 136 may be directed towards a light absorber (not shown). Optical modulator 134 may be an acousto-optic modulator or an electro-optic modulator. Exemplary of optical modulator 134 is an acousto-optic modulator model No. AA.MG.40/A6@10.6 $\mu$m available from A&A Opto-Electronique, 6-Rue de Versailles, F-78470 St. Remy Les Chevreuse, France. The specifications for this particular acousto-optic modulator states that the modulator has a working wavelength of 10.6 $\mu$m and an angular separation between the zero order or the first order diffraction of 77 milliradians as well as a useful aperture of 6 mm and a modulation bandwidth of 500 kHz.

Control loop 133 includes a beamsplitter 140 that separates and diverts a portion 144 of beam 138 towards a detector 146. The remainder 142 of beam 138 is transmitted through beamsplitter 140 to lens 148 where it is focussed on splicing area 115 in the manner as shown in more detail in FIG. 2.

Figure 4A:
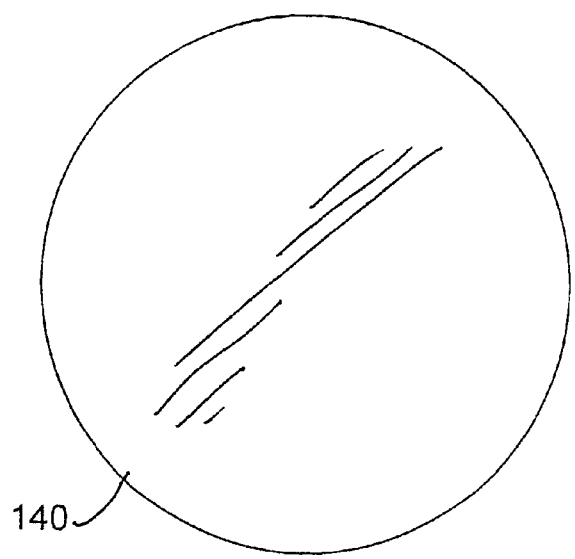
FIG. 4A is a front elevational view of an optical beamsplitter used in the splicing apparatus shown in FIG. 3.
Figure 4B:
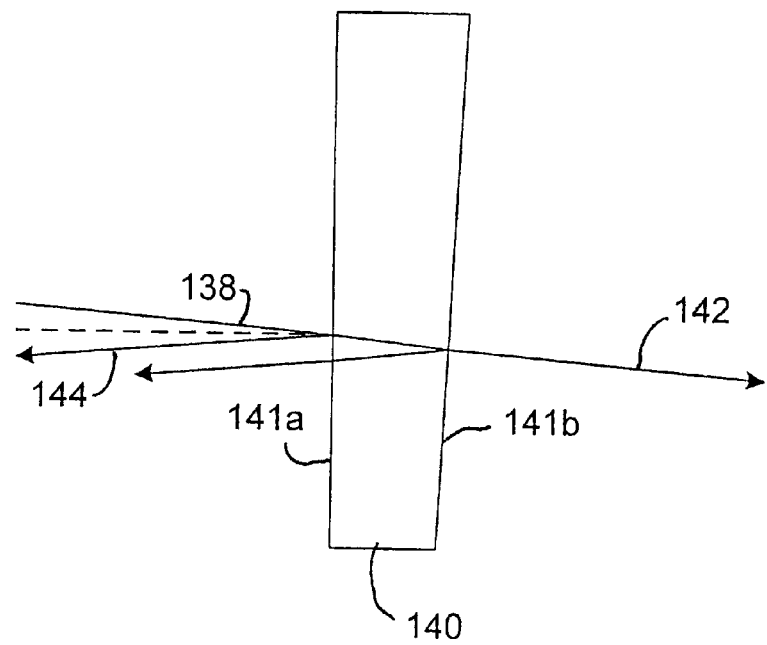
FIG. 4B is a side elevational view of the beamsplitter shown in FIG. 4A.

Beamsplitter 140 is preferably a prismatic window. As shown in FIGS. 4A and 4B, beamsplitter 140 may have a disc-like shape and have two opposed faces 141a and 141b that are inclined with respect to one another at 2°. Preferably, beamsplitter 140 has a diameter of 24.95 mm, a thickness at the bottom portion thereof of approximately 3 mm, and a thickness at the upper portion of approximately 3.2 mm. Beamsplitter 140 is preferably made of ZnSe and is disposed such that the incident laser beam 138 forms a 2° angle with respect to a surface normal. Beamsplitter 140 deflects beam 144 towards detector 146. Beam 144 is the portion of beam 138 reflected from the first surface 141a. Any portion of beam 138 that is reflected off the rear surface 141b of beamsplitter 140 may be absorbed using a light absorbing element. The remainder of beam 138 is transmitted through beamsplitter 140 as beam 142.

Detector 146 may be any conventional photodetector and is preferably an infrared detector manufactured by SYNRAD, model No. 48-CL, distributed by BFI-OPTILAS. Detector 146 generates an electrical signal having a voltage representing the detected intensity of laser beam 144. Because the intensity of laser beam 144 is of known proportion to laser beam 142, the electrical signal generated by detector 146 is also representative of the intensity of laser beam 142.

Control loop 133 further includes a pulse generator 152 and a comparator 154, which compares the voltage of electrical pulses generated by pulse generator 152 with the voltage of the electrical signal generated by detector 146. The output of comparator 154 is supplied to an amplifier 156 via an integrator 158. Amplifier 156 responds to the integrated electrical signal supplied from integrator 158 by adjusting the amplitude of a fixed-frequency signal supplied from a signal generator 160. The selectively amplified fixed-frequency signal is then supplied from amplifier 156 to the input of optical modulator 134. Optical modulator 134 varies the intensity of the first order diffracted beam 138 in response to the varying amplitude levels of the electrical signal supplied from amplifier 156. A preferred amplifier 156 and signal generator 160 are available as a single package from A&A Opto-Electronique, model reference No. AA.MOD.40-50 W, which has a carrier frequency of 40 MHz, a working range from 0 W to 50 W, and input levels from 0 V to 5 V on a 1 Ω load.

During operation, $CO_2$ laser 130 generates a pulsed laser beam 132. At the same time, pulse generator 152, which may be an appropriately programmed personal computer, generates a pulse signal in synchronism with the pulses of $CO_2$ laser 130. The pulse shape produced by the pulse generator 152 preferably has a profile corresponding to the desired intensity profile of the laser pulse that is detected by detector 146. In this manner, the amplitudes of the pulses produced by pulse generator 152 and detector 146 may be directly compared. If the amplitudes are equal, comparator 154 has a 0 volt output. Amplifier 156 does not change the amplitude of the fixed-frequency signal supplied by signal generator 160 when the output of comparator 154 is 0 volt. On the other hand, if the amplitude of the electrical pulse signal generated by detector 146 is different from that of pulse generator 152, the difference is applied to amplifier 156 a s a positive or negative voltage. Amplifier 156 responds by either increasing or decreasing the amplitude of the fixed-frequency signal thereby changing the intensity of beam 138 and hence beams 144 and 142. The intensity of beam 138 is therefore adjusted until there is no difference between the electrical pulse signals generated by detector 146 and pulse generator 152.

By acting directly on the laser beam 138 instead of on $CO_2$ laser 130 itself, the output beam 132 of $CO_2$ laser 130 itself is not perturbed by control loop 133. With such a system, 0.1 percent stability can be realized on the intensity of laser beam 142 during the pulse, resulting in a temperature variation of approximately ±2° C. at splice area 115. Control of the splicing temperature to within ±2° C. is a significant improvement over prior systems that only allowed temperature control to within ±36° C.

Using the inventive fiber splicing apparatus, a plurality of pairs of fibers to be spliced may be aligned and supported in parallel, and then, sequentially moved into the path of the laser beam. In this manner, a large number of fibers may be quickly and precisely spliced in an automated assembly system.

Although the present invention has been described with respect to fiber splicing, the apparatus shown in FIG. 3 may also be used for other applications such as cutting, melting, or otherwise heating a fiber or other optical waveguide or component. Such applications would include, for example, creating or trimming a fiber Bragg grating or other form of fiber grating by heating a region of the fiber to cause diffusion of a dopant in the fiber core.

It will become apparent to those skilled in the art that various modifications to the preferred embodiment of the invention as described herein can be made without departing from the spirit or scope of the invention as defined by the appended claims.

The invention claimed is:

1. A method for splicing together the ends of at least two optical fibers comprising the steps of:
   supporting the two optical fibers such that the ends thereof are aligned and in physical contact;
   projecting a laser beam from a laser at an optical modulator; and
   controlling the optical modulator to modulate the laser beam and project the modulated laser beam onto the ends of the two optical fibers to heat and thereby fuse together the ends of the fibers, wherein said optical modulator modulates the laser beam by variably attenuating the intensity of the laser beam over a range of multiple attenuation levels such that the intensity of the modulated laser beam is maintained at a desired level.

2. The method of claim 1, wherein said laser is a $CO_2$ laser.

3. A method for splicing together the ends of at least two optical fibers comprising the steps of:
   supporting the two optical fibers such that the ends thereof are aligned and in physical contact;
   projecting a laser beam from a laser at an optical modulator; and
   controlling the optical modulator to modulate the laser beam and project the modulated laser beam onto the ends of the two optical fibers to heat and thereby fuse together the ends of the fibers, wherein said optical modulator modulates the laser beam by variably attenuating the intensity of the laser beam such that the intensity of the modulated laser beam is maintained at a desired level, wherein the optical fibers are each supported by a support member, the support members being spaced less than 6 mm apart.

4. The method of claim 1, wherein the two optical fibers are each supported by a support member, the support members being spaced about 1 mm apart.

5. An apparatus for splicing together the ends of two optical fibers comprising:
   a support structure including two support members each of which supports one of the two optical fibers;
   a laser emitting a laser beam;
   an optical modulator positioned to receive said laser beam, wherein said optical modulator emits a first modulated laser beam towards the ends of the two optical fibers, and wherein said optical modulator variably attenuates the received laser beam over a range of multiple attenuation levels; and
   a control loop that monitors the intensity of the first modulated laser beam and controls said optical modulator to regulate the intensity of the first modulated laser beam.

6. The apparatus of claim 5, wherein said two support members are spaced less than 6 mm apart.

7. The apparatus of claim 5, wherein said two support members are spaced about 1 mm apart.

8. The apparatus of claim 5, wherein said laser is a $CO_2$ laser.

9. The apparatus of claim 5, wherein said control loop further includes:
   a beamsplitter positioned to receive the first modulated laser beam, said beamsplitter dividing the first modulated laser beam into a second modulated laser beam and a third modulated laser beam, wherein the second modulated laser beam is directed onto the ends of the two optical fibers to be sliced.

10. The apparatus of claim 9, wherein said control loop further includes:
    a detector positioned to receive the third modulated laser beam, said detector generating an electrical signal representing the intensity of the third modulated laser beam; and
    a control circuit coupled to said optical modulator and said detector, wherein said control circuit monitors and controls the intensity of the second modulated laser beam.

11. The apparatus of claim 10, wherein said control circuit includes:
    a signal generator supplying a fixed-frequency signal to drive said optical modulator; and
    an amplifier coupled to said signal generator, said optical modulator, and said detector, wherein said amplifier selectively amplifies the fixed-frequency signal generated by said signal generator in response to the electrical signal generated by said detector and supplying the amplified fixed-frequency signal to said optical modulator.

12. The apparatus of claim 11, wherein said optical modulator controls the intensity of the first modulated laser beam in response to changes in the amplitude of the amplified fixed-frequency signal.

13. The apparatus of claim 11, wherein said optical modulator is an acousto-optic modulator.

14. The apparatus of claim 11, wherein said control loop further includes:
    a pulse generator supplying a pulsed electrical signal;
    a comparator coupled to said pulse generator and said detector, wherein said comparator generates a signal representative of the difference between the amplitude of the pulsed electrical signal and the amplitude of the electrical signal generated by said detector; and
    an integrator coupled between said comparator and said amplifier, wherein said integrator integrates the signal from said comparator and supplies the integrated signal to said amplifier.

15. The apparatus of claim 5, wherein said optical modulator is an acousto-optic modulator.

16. The apparatus of claim 15, wherein said acousto-optic modulator diffracts the received laser beam and the first modulated laser beam that is emitted by said acousto-optic modulator is first order of diffraction of laser beam received by said acousto-optic modulator.

17. An apparatus for splicing together the ends of two optical fibers comprising
    a support structure including two support members each of which supports one of the two optical fibers;
    an optical modulator positioned to receive and selectively modulate the intensity of a laser beam from the laser and to project a first modulated laser beam along a first optical path, and wherein said optical modulator variably attenuates the received laser beam over a range of multiple attenuation levels;
    a beamsplitter positioned to receive the first modulated laser beam from said optical modulator, said beamsplitter divides the first modulated laser beam into a second modulated laser beam and a third modulated laser beam that is directed along a second optical path while the second modulated laser beam is directed along the first optical path towards the ends of the two optical fibers;
    a detector positioned to receive the third modulated laser beam, said detector generating an electrical signal representing the intensity of the third modulated laser beam; and
    a control circuit coupled to said optical modulator and said detector, said control circuit using the electrical signal supplied from said detector to monitor the intensity of the third modulated laser beam and to control said optical modulator to regulate the intensity of the second modulated laser beam.

18. The apparatus of claim 17, wherein said optical modulator is an acousto-optic modulator.

19. The apparatus of claim 17, wherein said laser is a $CO_2$ laser.

20. An apparatus for controlling the intensity of a laser beam generated by a laser comprising:
    an optical modulator positioned to receive and selectively modulate the intensity of a laser beam from the laser and to project a first modulated laser beam along a first optical path;
    a beamsplitter positioned to receive the first modulated laser beam from said optical modulator, said beamsplitter divides the first modulated laser beam into a second modulated laser beam and a third modulated laser beam that is directed along a second optical path while the second modulated laser beam is directed along the first optical path;
    a detector positioned to receive the third modulated laser beam, said detector generating an electrical signal representing the intensity of the third modulated laser beam; and
    a control circuit coupled to said optical modulator and said detector, said control circuit using the electrical signal supplied from said detector to monitor the intensity of the third modulated laser beam and to control said optical modulator to regulate the intensity of the second modulated laser beam wherein said control circuit includes:
    a signal generator supplying a fixed-frequency signal for driving said optical modulator; and
    an amplifier coupled to signal generator, said optical modulator, and said detector, said amplifier selectively amplifiers the fixed-frequency signal general by said signal generator in response to electrical signal supplied by said detector and supplying the amplified fixed-frequency signal to said optical modulator.

21. The apparatus of claim 20, wherein said optical modulator adjusts the intensity of the first modulated laser beam in response to changes in the amplitude of the amplified fixed-frequency signal supplied by said amplifier.

22. The apparatus of claim 20, wherein said optical modulator is an acousto-optic modulator.

23. The apparatus of claim 20, wherein said control loop further includes:
- a pulse generator supplying a pulsed electrical signal;
- a comparator coupled to said pulse generator and said detector, said comparator compares an amplitude of the pulsed electrical signal with that of the electrical signal generated by said detector; and
- an integrator coupled between said comparator and said amplifier, said integrator integrates a signal output from said comparator and supplies the integrated signal to said amplifier.

24. The apparatus of claim 18, wherein said acousto-optic modulator diffracts the received laser beam and the second modulated laser beam that is emitted by said beamsplitter is a first order of diffraction of the laser beam received by said acousto-optic modulator.

* * * * *

UNITED STATES PATENT AND TRADEMARK OFFICE
CERTIFICATE OF CORRECTION

PATENT NO. : 6,612,754 B2
DATED : September 2, 2003
INVENTOR(S) : Brahim Dahmani et al.

It is certified that error appears in the above-identified patent and that said Letters Patent is hereby corrected as shown below:

Column 1,
Line 7, "base" should be -- based --.
Line 8, "00400815,7" should be -- 00400815.7, --.
Line 27, "14$b$of" should be -- 14$b$ of --.
Lines 33, 42 and 45, "distance a" should be -- distance $a$ --.

Column 3,
Lines 49 and 55, "distance b" should be -- distance $b$ --.
Line 50, "distance a" should be -- distance $a$ --.

Column 5,
Line 43, "a s" should be -- as --.

Column 6,
Lines 46-48, "1, wherein the two optical fibers are each supported by a support member, the support members being" should be -- 2, wherein the support members are --.

Column 7,
Line 10, "sliced" should be -- spliced --.
Line 58, "is" should be -- is a -- and "of" should be -- of the --.
Line 61, "after "comprising" insert -- : --.

Column 8,
Line 57, "amplifiers" should be -- amplifies -- and "general" should be -- generated --.
Line 58, "to" should be -- to the --.

Signed and Sealed this

Tenth Day of February, 2004

JON W. DUDAS
*Acting Director of the United States Patent and Trademark Office*